United States Patent
Lin et al.

(10) Patent No.: US 11,467,455 B2
(45) Date of Patent: Oct. 11, 2022

(54) DISPLAY DEVICE

(71) Applicant: Au Optronics Corporation, Hsinchu (TW)

(72) Inventors: Hung-Che Lin, Hsinchu (TW);
Nai-Wen Chang, Hsinchu (TW);
Shun-Ling Hou, Hsinchu (TW);
Sheng-Ju Ho, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/161,694

(22) Filed: Jan. 29, 2021

(65) Prior Publication Data
US 2022/0050342 A1  Feb. 17, 2022

(30) Foreign Application Priority Data
Aug. 12, 2020  (TW) .................. 109127276

(51) Int. Cl.
*G02F 1/1362* (2006.01)
*G02F 1/1343* (2006.01)
*G02F 1/1368* (2006.01)

(52) U.S. Cl.
CPC ...... *G02F 1/136218* (2021.01); *G02F 1/1368* (2013.01); *G02F 1/13629* (2021.01); *G02F 1/134363* (2013.01); *G02F 1/136222* (2021.01); *G02F 1/136227* (2013.01)

(58) Field of Classification Search
CPC ......... G02F 1/136222; G02F 1/136227; G02F 1/136218; G02F 1/1368; G02F 1/13629; G02F 1/134363
See application file for complete search history.

(56) References Cited

U.S. PATENT DOCUMENTS

| | | | |
|---|---|---|---|
| 8,072,080 B2 * | 12/2011 | Moriwaki | G02F 1/136227 257/72 |
| 8,300,180 B2 | 10/2012 | Liu et al. | |
| 8,643,797 B2 | 2/2014 | Liu et al. | |
| 9,036,121 B2 | 5/2015 | Itoh et al. | |

(Continued)

FOREIGN PATENT DOCUMENTS

| | | |
|---|---|---|
| CN | 102736303 | 10/2012 |
| CN | 102859430 | 1/2013 |

(Continued)

*Primary Examiner* — Dung T Nguyen
(74) *Attorney, Agent, or Firm* — JCIPRNET

(57) ABSTRACT

A display device includes a first substrate, a first metal layer, a gate insulating layer, semiconductor channels, a second metal layer, a color filter layer, a shielding electrode, an insulating layer, pixel electrodes, a liquid crystal layer, a second substrate and a second common electrode. The first metal layer is located on the first substrate and includes scan lines, gates and first common electrodes. The gate insulating layer is located on the first metal layer. The semiconductor channels are located on the gate insulating layer. The second metal layer is located on the gate insulating layer, and includes sources, drains and data lines. The color filter layer is located on the second metal layer. The shielding electrode at least partially overlaps the second metal layer. The insulating layer is located on the color filter layer. The second common electrode is located on the second substrate.

12 Claims, 18 Drawing Sheets

(56) References Cited

U.S. PATENT DOCUMENTS

| | | |
|---|---|---|
| 9,773,819 B2 | 9/2017 | Cheng et al. |
| 10,002,578 B2 | 6/2018 | Chung et al. |
| 2010/0091230 A1 | 4/2010 | Liu et al. |
| 2013/0010220 A1 | 1/2013 | Liu et al. |
| 2013/0033469 A1 | 2/2013 | Itoh et al. |
| 2013/0120679 A1* | 5/2013 | Qin .................. G02F 1/134363 349/42 |
| 2014/0104527 A1* | 4/2014 | Yang ................ G02F 1/136227 349/43 |
| 2016/0252793 A1 | 9/2016 | Cheng et al. |
| 2017/0061909 A1 | 3/2017 | Chung et al. |

FOREIGN PATENT DOCUMENTS

| | | |
|---|---|---|
| CN | 202939576 | 5/2013 |
| CN | 203941365 | 11/2014 |
| CN | 104375340 | 2/2015 |
| CN | 105044971 | 11/2015 |
| CN | 109240017 | 1/2019 |
| CN | 110879499 | 3/2020 |
| TW | 201015176 | 4/2010 |
| TW | 201017303 | 5/2010 |
| TW | 201708913 | 3/2017 |
| TW | I692089 | 4/2020 |

* cited by examiner

DISPLAY DEVICE

CROSS-REFERENCE TO RELATED APPLICATION

This application claims the priority benefit of Taiwan application no. 109127276, filed on Aug. 12, 2020. The entirety of the above-mentioned patent application is hereby incorporated by reference herein and made a part of this specification.

TECHNICAL FIELD

The invention relates to a display device, and more particularly, relates to a display device having a shielding electrode.

BACKGROUND

As the mainstream in display devices, liquid crystal display devices are widely used in various consumer electronic products such as LCD TVs, digital cameras, mobile phones, tablets, desktop computers or notebook computers because of their thin body, power saving and no radiation. Most of the existing liquid crystal display devices are backlight liquid crystal displays, which utilize a backlight module disposed behind a liquid crystal panel as a light source. In general, the liquid crystal panel includes a color filter substrate, a TFT array substrate, a liquid crystal layer and a polarizer. The liquid crystal panel rotates liquid crystal molecules by the electric field to change the polarization direction of the light, so as to control whether the light emitted by the backlight module can pass through the liquid crystal panel.

In some liquid crystal display devices, in order to increase an aperture ratio of the liquid crystal panel, a color filter element is disposed on the TFT array substrate (i.e., the color filter on array (COA) technology is adopted). Because the color filter element is a dielectric material, the color filter element disposed on the TFT array substrate can easily form a capacitance together with a conductive structure in the TFT array substrate. However, the capacitance corresponding to the color filter is prone to leakage and affects the quality of a display image.

SUMMARY

The invention provides a display device that can solve the problem of capacitance leakage.

At least one embodiment of the invention provides a display device, which includes a first substrate, a first metal layer, a gate insulating layer, semiconductor channels, a second metal layer, a color filter layer, a shielding electrode, an insulating layer, pixel electrodes, a liquid crystal layer, a second substrate and a second common electrode. The first metal layer is located on the first substrate and includes scan lines, gates and first common electrodes. The gates are respectively connected to the scan lines. The first common electrodes are separated from the scan lines. The gate insulating layer is located on the first metal layer. The semiconductor channels are located on the gate insulating layer, and overlap the gates. The second metal layer is located on the gate insulating layer, and includes sources, drains and data lines. The sources and the drains are respectively electrically connected to the semiconductor channels. The data lines are respectively electrically connected to the sources. The color filter layer is located on the second metal layer, and has a plurality of first openings overlapping the drains. The shielding electrode at least partially overlaps the second metal layer. The insulating layer is located on the color filter layer, and has a plurality of second openings overlapping the first openings. The pixel electrodes are located on the insulating layer, and are electrically connected to the drains through the second openings. Each of the pixel electrodes has a plurality of slits. The liquid crystal layer is located between the first substrate and the second substrate. The second common electrode is located on the second substrate.

At least one embodiment of the invention provides a display device, which includes a first substrate, a second substrate, a liquid crystal layer, a scan line, a first common electrode, a gate, a gate insulating layer, a semiconductor channel, a source, a drain, a data line, a color filter layer, an insulating layer, a shielding electrode, a pixel electrode and a second common electrode. The liquid crystal layer is located between the first substrate and the second substrate. The scan line and the first common electrode are located on the first substrate. The first common electrode includes a main portion extending along a first direction and a plurality of branch portions extending along a second direction. The branch portions are connected to the main portion. The scan line extends along the first direction. The gate is connected to the scan line. The gate insulating layer is located on the gate. The semiconductor channel is located on the gate insulating layer, and overlaps the gate. The source and the drain are electrically connected to the semiconductor channel. The data line is electrically connected to the source, and extends along the second direction. The color filter layer is located on the gate insulating layer, and has a first opening overlapping the drain. The insulating layer is located on the color filter layer, and has a second opening overlapping the first opening. The pixel electrode is located on the insulating layer, and is electrically connected to the drain through the second opening. The pixel electrode has a plurality of slits. A normal projection of the shielding electrode on the first substrate is adjacent to or overlaps a normal projection of the branch portions on the first substrate. The shielding electrode and the pixel electrode have the same potential. The shielding electrode and the common electrode have the same potential. The second common electrode is located on the second substrate.

At least one embodiment of the invention provides a display device, which includes a first substrate, a second substrate, a liquid crystal layer, a first metal layer, a gate insulating layer, a plurality of semiconductor channels, a second metal layer, a color filter layer, a shielding electrode, an insulating layer, a plurality of pixel electrodes and a second common electrode. The liquid crystal layer is located between the first substrate and the second substrate. The first metal layer is located on the first substrate and includes a plurality of scan lines, a plurality of gates and a plurality of first common electrodes. The scan lines extend along the first direction. The gates are respectively connected to the scan lines. The first common electrodes are separated from the scan lines. The gate insulating layer is located on the first metal layer. The semiconductor channels are located on the gate insulating layer, and overlap the gates. The second metal layer is located on the gate insulating layer, and includes a plurality of sources, a plurality of drains, a plurality of data lines and a plurality of gate signal lines. The sources and the drains are respectively electrically connected to the semiconductor channels. The data lines extend along a second direction, and are respectively electrically connected to the sources. The gate signal lines extend along the second direction, and are respectively electrically connected to the scan lines through a plurality of through holes penetrating the gate insulating layer. The color filter layer is located on the second metal layer, and has a plurality of first openings overlapping the drains. The shielding electrode at least partially overlaps the second metal layer. The insulating layer is located on the color filter layer, and has a plurality of second openings overlapping the first openings. The pixel electrodes are located on the insulating layer, and are electrically connected to the drains through the second openings. Each of the pixel electrodes has a plurality of first slits extending along a third direction and a plurality of second slits extending along a fourth direction, and an area between the first slits and the second slits of each of the pixel electrodes overlaps corresponding ones of the data lines and the gate signal lines. The second common electrode is located on the second substrate.

DETAILED DESCRIPTION

Figure 1:
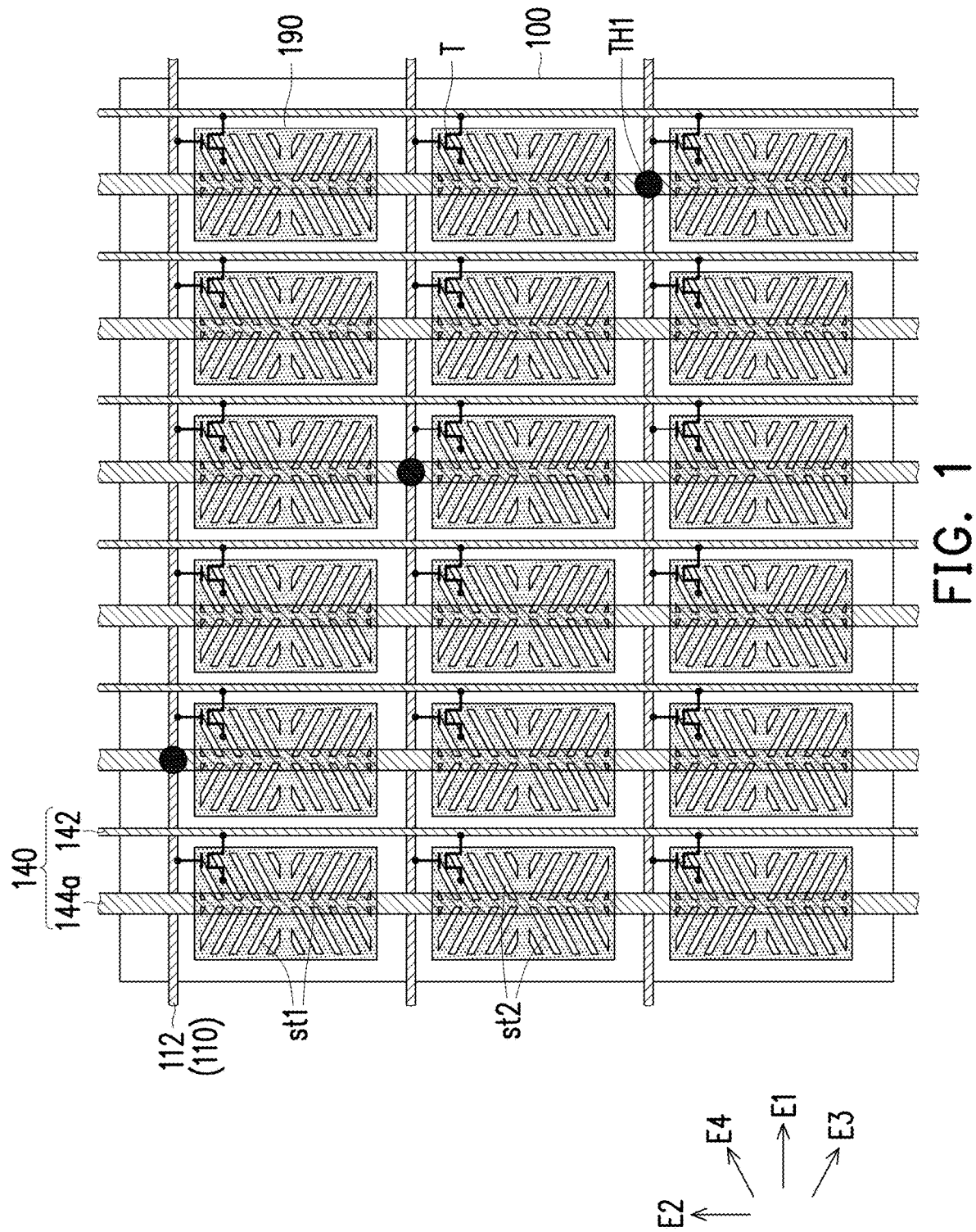
FIG. 1 is a schematic top view of a display device according to an embodiment of the invention.

FIG. 1 is a schematic view of a display device according to an embodiment of the invention.

Referring to FIG. 1, a display device 10 includes a first substrate 100, a plurality of scan lines 112, a plurality of data lines 142, a plurality of gate signal lines 144a, a plurality of switch elements T and a plurality of pixel electrodes 190.

In this embodiment, the scan lines 112 belong to a first metal layer 110, and the data lines 142 and the gate signal lines 144a belong to a second metal layer 140. A gate insulating layer (not shown) is sandwiched between the first metal layer 110 and the second metal layer 140. The gate signal lines 144a are respectively electrically connected to the scan lines 112 through a plurality of through holes TH1 penetrating the gate insulating layer. In this embodiment, the scan lines 112 extend along a first direction E1, and the data lines 142 and the gate signal lines 144a extend along a second direction E2. With the arrangement of the gate signal lines 144a, a signal source of the scan lines 112 (e.g., a gate driver chip) and a signal source of the data lines 142 (e.g., a source driver chip) may be disposed on the same side of a display area to reduce a border area of the display device.

Each of the switch elements T is electrically connected to a corresponding one of the scan lines 112, a corresponding one of the data lines 142 and a corresponding one of the pixel electrodes 190. In this embodiment, the pixel electrodes 190 arranged in the same column are electrically connected to a corresponding one of the data lines 142 through the switch elements T arranged in the same column.

Each of the pixel electrodes 190 has a plurality of first slits st1 extending along a third direction E3 and a plurality of second slits st2 extending along a fourth direction E4. An optical black area is provided between the first slits st1 and the second slits st2 of each of the pixel electrodes 190. The optical black area refers to an area in which the liquid crystal molecules are not easily turned by electric field control, and the light emitted by the backlight module cannot easily pass through the optical black area. In this embodiment, the area (the optical black area) between the first slits st1 and the second slits st2 overlaps the gate signal line 144a. Accordingly, the influence of the gate signal line 144a on the aperture ratio of the display device is reduced, and the wiring space can be used more effectively. In some embodiments, a width of each of the first slits st1 and the second slits st2 is 1.5 µm to 4 µm. In this embodiment, the data line 142 is located between adjacent two columns of the pixel electrodes 190.

Figure 2A:
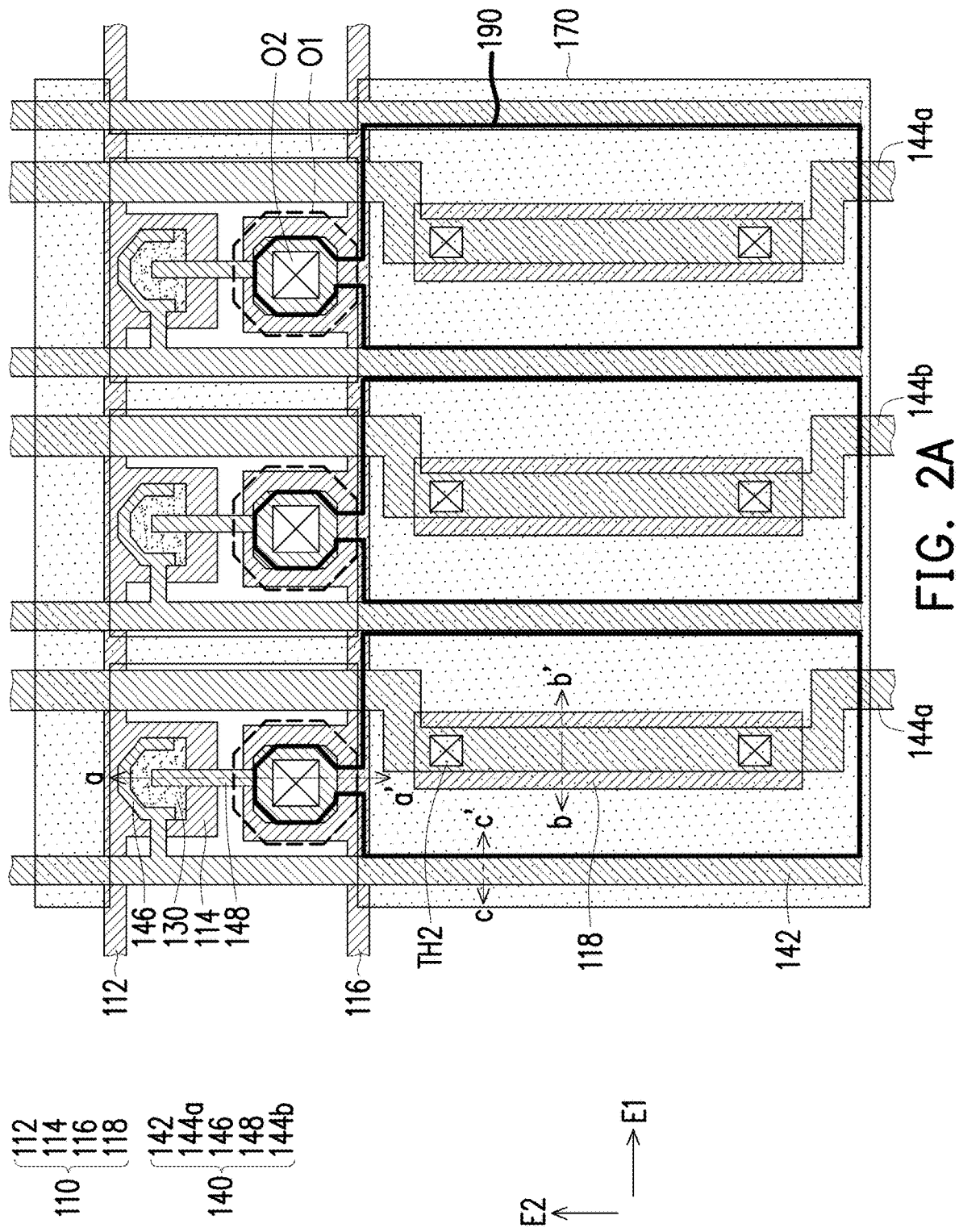
FIG. 2A is a schematic top view of a display device according to an embodiment of the invention.
Figure 2B:
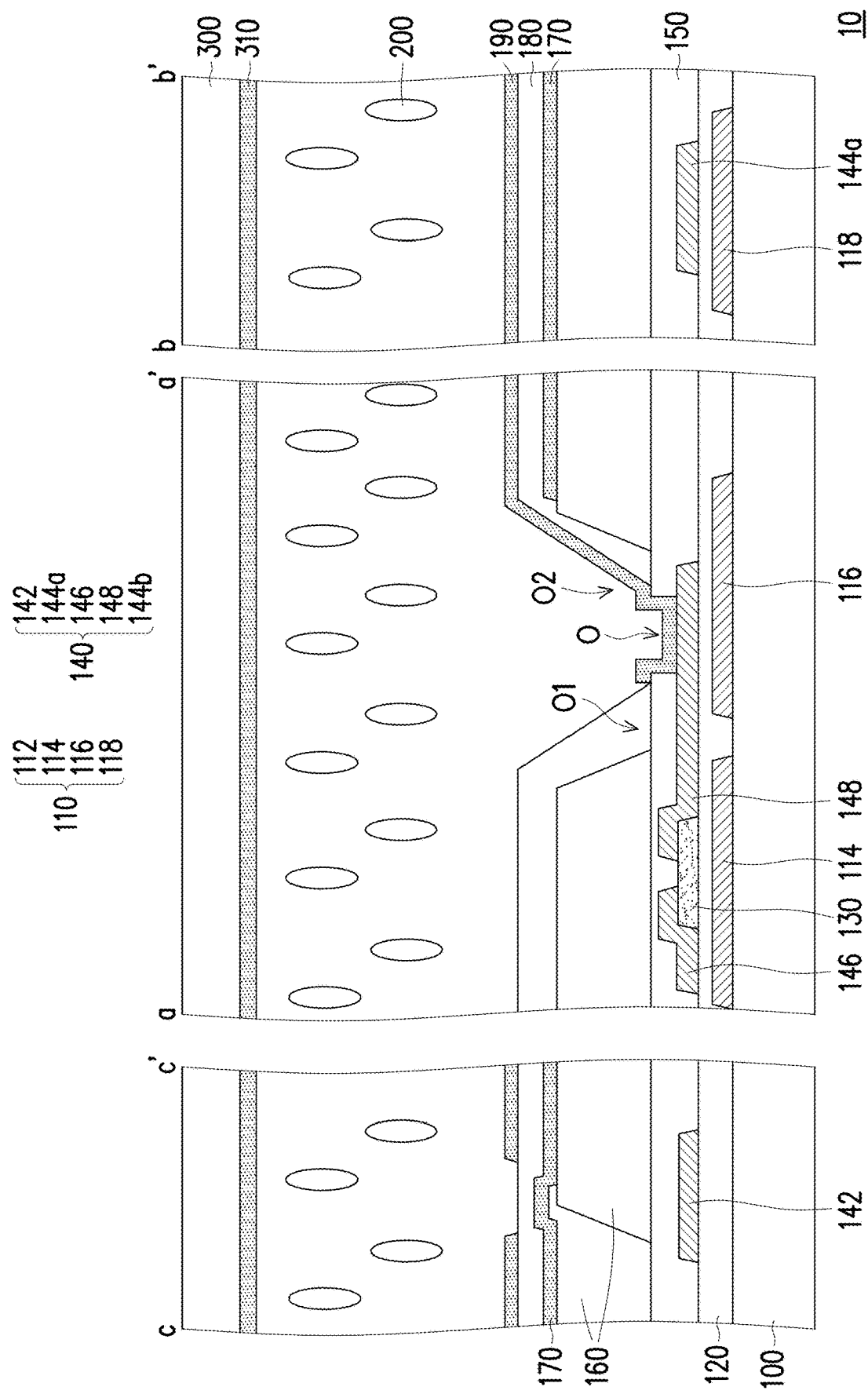
FIG. 2B is a schematic cross-sectional view of a display device according to an embodiment of the invention.

FIG. 2A is a schematic top view of a display device according to an embodiment of the invention. FIG. 2B is a schematic cross-sectional view of a display device according to an embodiment of the invention. FIG. 2B is a schematic cross-sectional view corresponding to the lines aa', bb' and cc' of FIG. 2A, for example.

It should be noted that the reference numerals and a part of the contents in the embodiment of FIG. 1 are also used to describe the embodiments of FIG. 2A and FIG. 2B, in which the same reference numerals are used to represent identical or similar elements, and thus descriptions of the same technical contents are omitted. For the description of the omitted parts, reference may be made to the foregoing embodiments, which will not be repeated here.

Referring to FIG. 2A and FIG. 2B, a display device 10 includes a first substrate 100, a first metal layer 110, a gate insulating layer 120, a plurality of semiconductor channels 130, a second metal layer 140, a color filter layer 160, a shielding electrode 170, an insulating layer 180, a plurality of pixel electrodes 190, a liquid crystal layer 200, a second substrate 300 and a second common electrode 310. In this embodiment, the display device 10 further includes a passivation layer 150 located between the second metal layer 140 and the color filter layer 160, but the invention is not limited thereto.

The first metal layer 110 is located on the first substrate 100 and includes a plurality of scan lines 112, a plurality of gates 114 and a plurality of first common electrodes 116. In this embodiment, the first metal layer 110 further includes a plurality of auxiliary structures 118.

The scan lines 112 and the first common electrodes 116 extend along a first direction E1. The gates 114 are respectively connected to the scan lines 112. The scan lines 112, the first common electrodes 116 and the auxiliary structures 118 are structurally separated from each other.

In this embodiment, the first metal layer 110 is a single-layer or multi-layer structure, and a shape thereof is defined by the same photomask.

The gate insulating layer 120 is located on the first metal layer 110. The semiconductor channels 130 are located on the gate insulating layer 120, and overlap the gates 114.

The second metal layer 140 is located on the gate insulating layer 120, and includes a plurality of data lines 142, a plurality of gate signal lines 144a, a plurality of sources 146 and a plurality of drains 148. In this embodiment, the second metal layer 140 further includes a plurality of common signal lines 144b.

The data lines 142, the gate signal lines 144a and the common signal lines 144b extend along a second direction E2. The data lines 142 are respectively electrically connected to the sources 146. The sources 146 and the drains 148 are respectively electrically connected to the semiconductor channels 130. The gate signal lines 144a are respectively electrically connected to the scan lines 112 through a plurality of through holes (referring to FIG. 1) of the gate insulating layer 120. In some embodiments, each of the scan lines 112 is electrically connected to more than one of the gate signal lines 144a. In this embodiment, the gate signal lines 144a and the common signal lines 144b are electrically connected to the auxiliary structures 118 through a plurality of through holes TH2 of the gate insulating layer 120 to reduce the resistance of wires.

The passivation layer 150 and the color filter layer 160 are located on the second metal layer 140. The passivation layer 150 has a plurality of openings O overlapping the drains 148. The color filter layer 160 has a plurality of first openings O1 overlapping the drains 148. The color filter layer 160 includes, for example, a red filter layer, a blue filter layer and a green filter layer. Boundaries between filter layers of different colors overlap the data lines 142, for example.

The shielding electrode 170 is located on the color filter layer 160. The shielding electrode 170 at least partially overlaps the second metal layer 140. In this embodiment, a material of the shielding electrode 170 includes a transparent conductive material.

The insulating layer 180 is located on the color filter layer 160, and has a plurality of second openings O2 overlapping the first openings O1 and the openings O. The shielding electrode 170 is located between the color filter layer 160 and the insulating layer 180.

The pixel electrodes 190 are located on the insulating layer 180, and are electrically connected to the drains 148 through the second openings O2. Each of the pixel electrodes 190 has a plurality of first slits extending along a third direction E3 (not shown in FIG. 2A; referring to FIG. 1) and a plurality of second slits extending along a fourth direction E4 (not shown in FIG. 2A; referring to FIG. 1). An area between the first slits and the second slits of each of the pixel electrodes 190 overlaps the gate signal line 144a and the common data line 144b.

In this embodiment, the shielding electrode 170 is located between the pixel electrode 190 and the color filter layer 160. In this embodiment, the shielding electrode 170 and the first common electrodes 116 have the same voltage. In some embodiments, the shielding electrode 170 and the first common electrodes 116 are electrically connected to each other. For instance, the shielding electrode 170 and the first common electrodes 116 are connected to each other in a non-display area.

In this embodiment, a voltage on the pixel electrodes 190 is different from the voltage on the shielding electrode 170 and the first common electrodes 116. The shielding electrode 170 is located between the pixel electrodes 190 and the first common electrodes 116 and can reduce the electric field between the pixel electrodes 190 and the first common electrodes 116. Since the shielding electrode 170 is located on the color filter layer 160, the shielding electrode 170 can reduce the adverse effect of the capacitance corresponding to the color filter layer 160 on the quality of the display screen. In this embodiment, the shielding electrode 170 can also be used to shield the gate signal lines 144a, the common signal lines 144b and the data lines 142, so as to reduce the parasitic capacitance between the pixel electrodes 190 and the gate signal lines 144a, the parasitic capacitance between the pixel electrodes 190 and the common signal lines 144b and the parasitic capacitance between the pixel electrodes 190 and the data lines 142.

In some embodiments, a passivation layer may be further provided between the shielding electrode 170 and the color filter layer 160 to prevent the shielding electrode 170 from being directly formed on the color filter layer 160 with an uneven surface, but the invention is not limited thereto The liquid crystal layer 200 is located between the first substrate 100 and the second substrate 300. The second common electrode 310 is located on the second substrate 300. In this embodiment, the display device 10 is a vertical alignment liquid crystal display panel.

Figure 3:
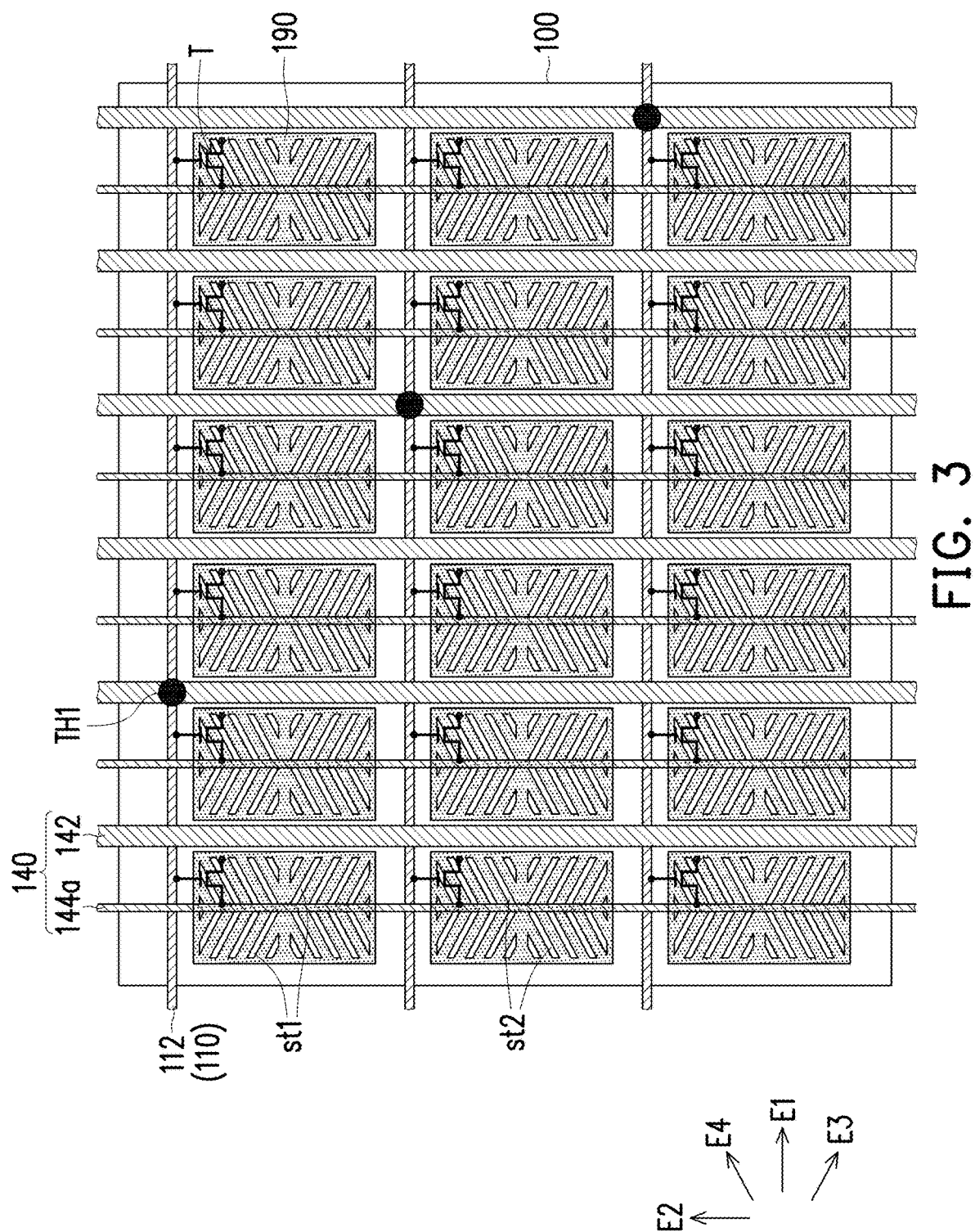
FIG. 3 is a schematic top view of a display device according to an embodiment of the invention.

FIG. 3 is a schematic top view of a display device according to an embodiment of the invention. It should be noted that the reference numerals and a part of the contents in the embodiment of FIG. 1 are also used to describe the embodiment of FIG. 3, in which the same reference numerals are used to represent identical or similar elements, and thus descriptions of the same technical contents are omitted. For the description of the omitted parts, reference may be made to the foregoing embodiments, which will not be repeated here.

Referring to FIG. 3, in a display device 20, an area between first slits st1 and second slit st2 (the optical black area) of the pixel electrode 190 overlaps the data line 142. Accordingly, the influence of the data line 142 on the aperture ratio of the display device is reduced, and the wiring space can be used more effectively. In this embodiment, each of the gate signal lines 144a is located between adjacent two columns of the pixel electrodes 190.

Figure 4A:
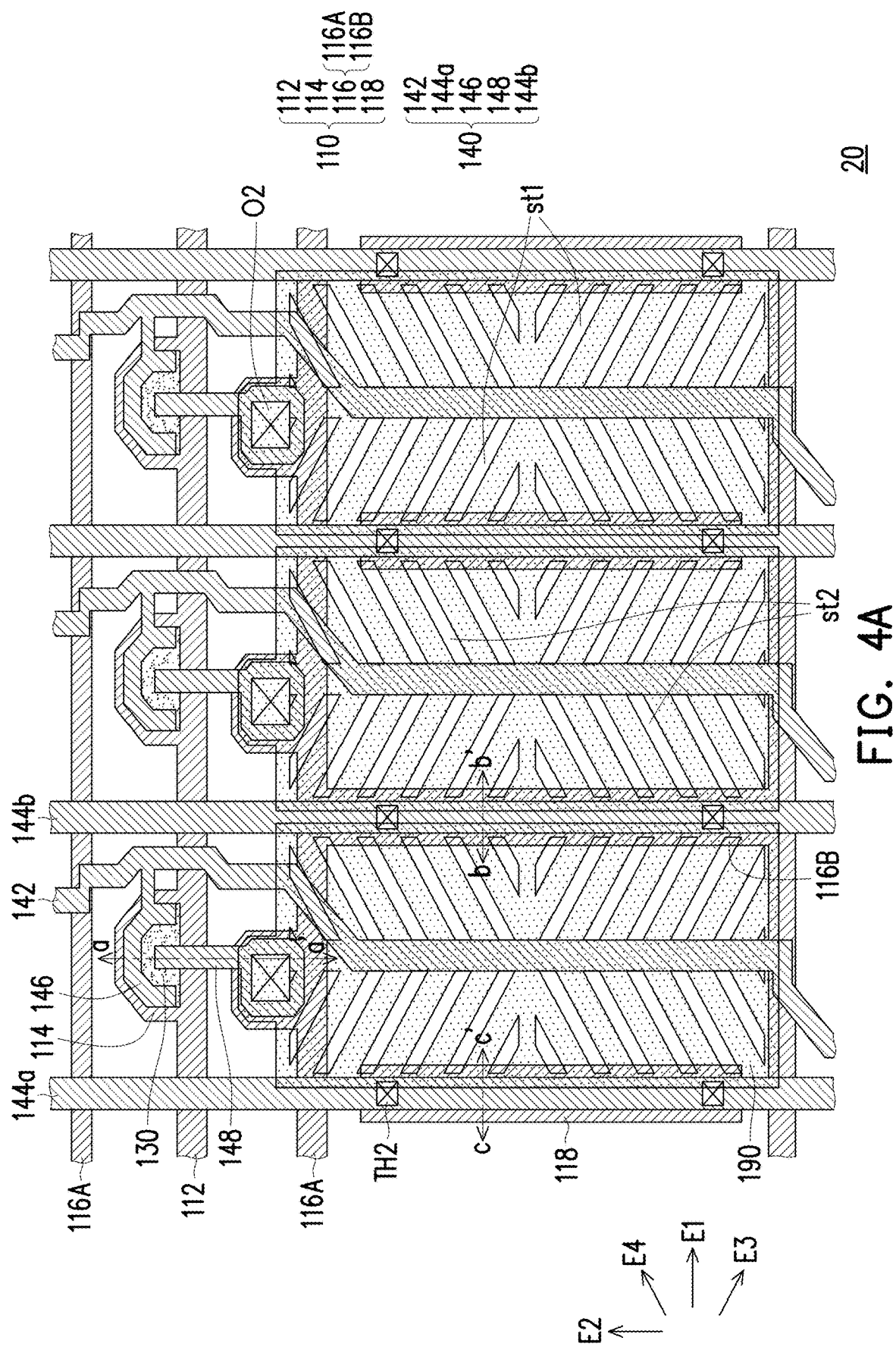
FIG. 4A is a schematic top view of a display device according to an embodiment of the invention.
Figure 4B:
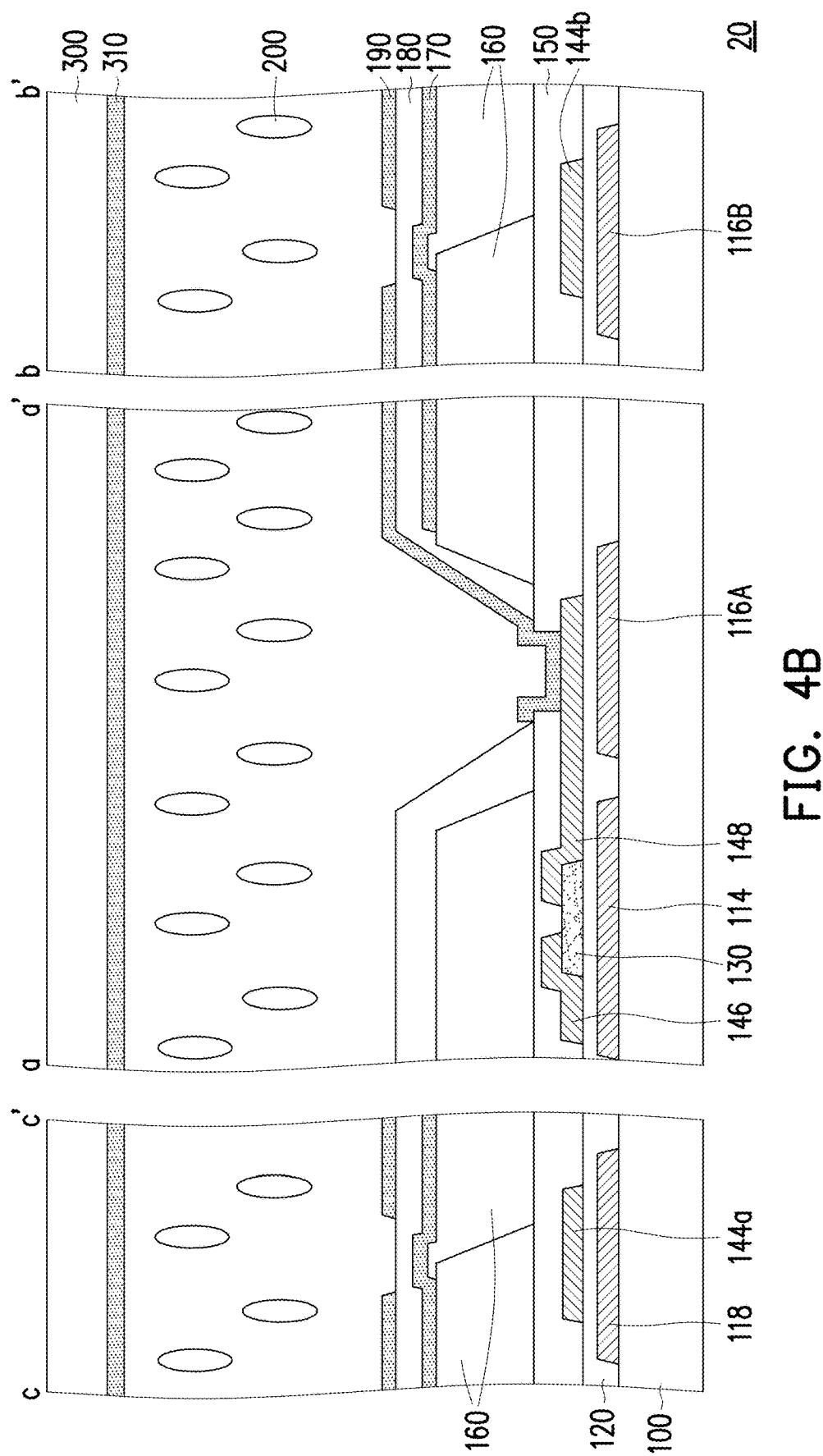
FIG. 4B is a schematic cross-sectional view of a display device according to an embodiment of the invention.

FIG. 4A is a schematic top view of a display device according to an embodiment of the invention. FIG. 4B is a schematic cross-sectional view of a display device according to an embodiment of the invention. FIG. 4B is a schematic cross-sectional view corresponding to the lines aa', bb' and cc' of FIG. 4A, for example.

It should be noted that the reference numerals and a part of the contents in the embodiment of FIG. 3 are also used to describe the embodiments of FIG. 4A and FIG. 4B, in which the same reference numerals are used to represent identical or similar elements, and thus descriptions of the same technical contents are omitted. For the description of the omitted parts, reference may be made to the foregoing embodiments, which will not be repeated here.

Referring to FIG. 4A and FIG. 4B, in this embodiment, a first common electrode 116 includes a main portion 116A extending along a first direction E1 and a plurality of branch portions 116B extending along a second direction E2. Here, the branch portions 116B are connected to the main portion 116A. In this embodiment, the main portion 116A is disposed on both sides of each of the scan lines 112. In other words, each of the scan lines 112 is located between two of the main portions 116A.

In this embodiment, a gate signal line 144a is located between adjacent two columns of pixel electrodes 190, and a common signal line 144b is located between adjacent two columns of the pixel electrodes 190. The common signal lines 144b are electrically connected to the branch portions 116B through a plurality of through holes TH2 of a gate insulating layer 120. The gate signal lines 144a are electrically connected to auxiliary structures 118 through the through holes TH2 of the gate insulating layer 120.

An area between first slits st1 and second slit st2 (the optical black area) of the pixel electrode 190 overlaps a data line 142. Accordingly, the influence of the data line 142 on the aperture ratio of the display device is reduced, and the wiring space can be used more effectively.

In this embodiment, a voltage on the pixel electrodes 190 is different from the voltage on a shielding electrode 170 (not shown in FIG. 4A) and the first common electrode 116. The shielding electrode 170 is located between the pixel electrodes 190 and the first common electrodes 116 and can reduce the electric field between the pixel electrodes 190 and the first common electrodes 116. Since the shielding electrode 170 is located on the color filter layer 160, the shielding electrode 170 can reduce the adverse effect of the capacitance corresponding to the color filter layer 160 on the quality of the display screen. In this embodiment, the shielding electrode 170 can also be used to shield the gate signal lines 144a, the common signal lines 144b and the data lines 142, so as to reduce the parasitic capacitance between the pixel electrodes 190 and the gate signal lines 144a, the parasitic capacitance between the pixel electrodes 190 and the common signal lines 144b and the parasitic capacitance between the pixel electrodes 190 and the data lines 142.

Figure 5:
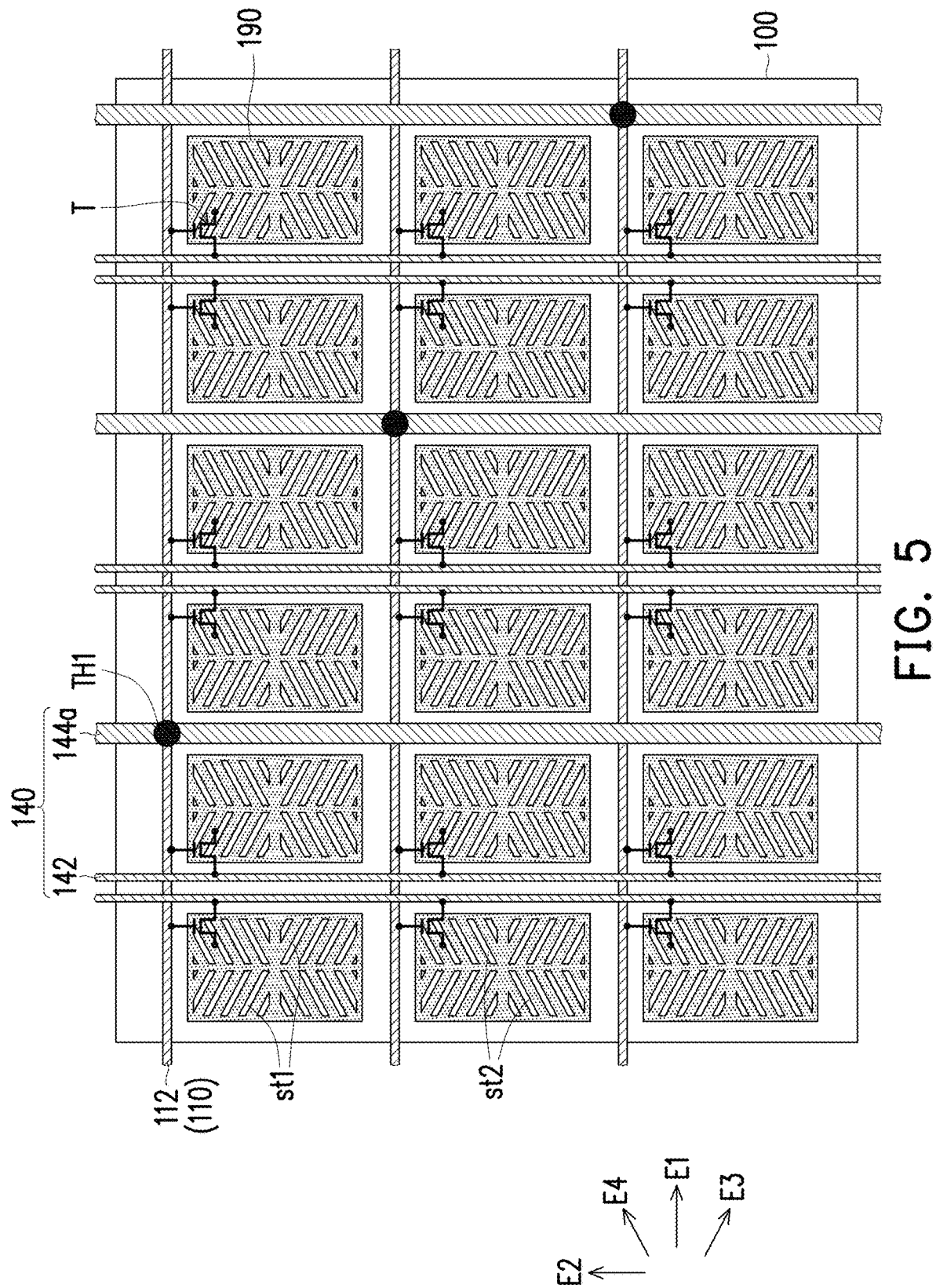
FIG. 5 is a schematic top view of a display device according to an embodiment of the invention.

FIG. 5 is a schematic top view of a display device according to an embodiment of the invention. It should be noted that the reference numerals and a part of the contents in the embodiment of FIG. 1 are also used to describe the embodiment of FIG. 5, in which the same reference numerals are used to represent identical or similar elements, and thus descriptions of the same technical contents are omitted. For the description of the omitted parts, reference may be made to the foregoing embodiments, which will not be repeated here.

Referring to FIG. 5, in a display device 50, adjacent two of data lines 142 are disposed between adjacent two columns of pixel electrodes 190. A gate signal line 144a is disposed between adjacent two columns of the pixel electrodes 190.

Figure 6A:
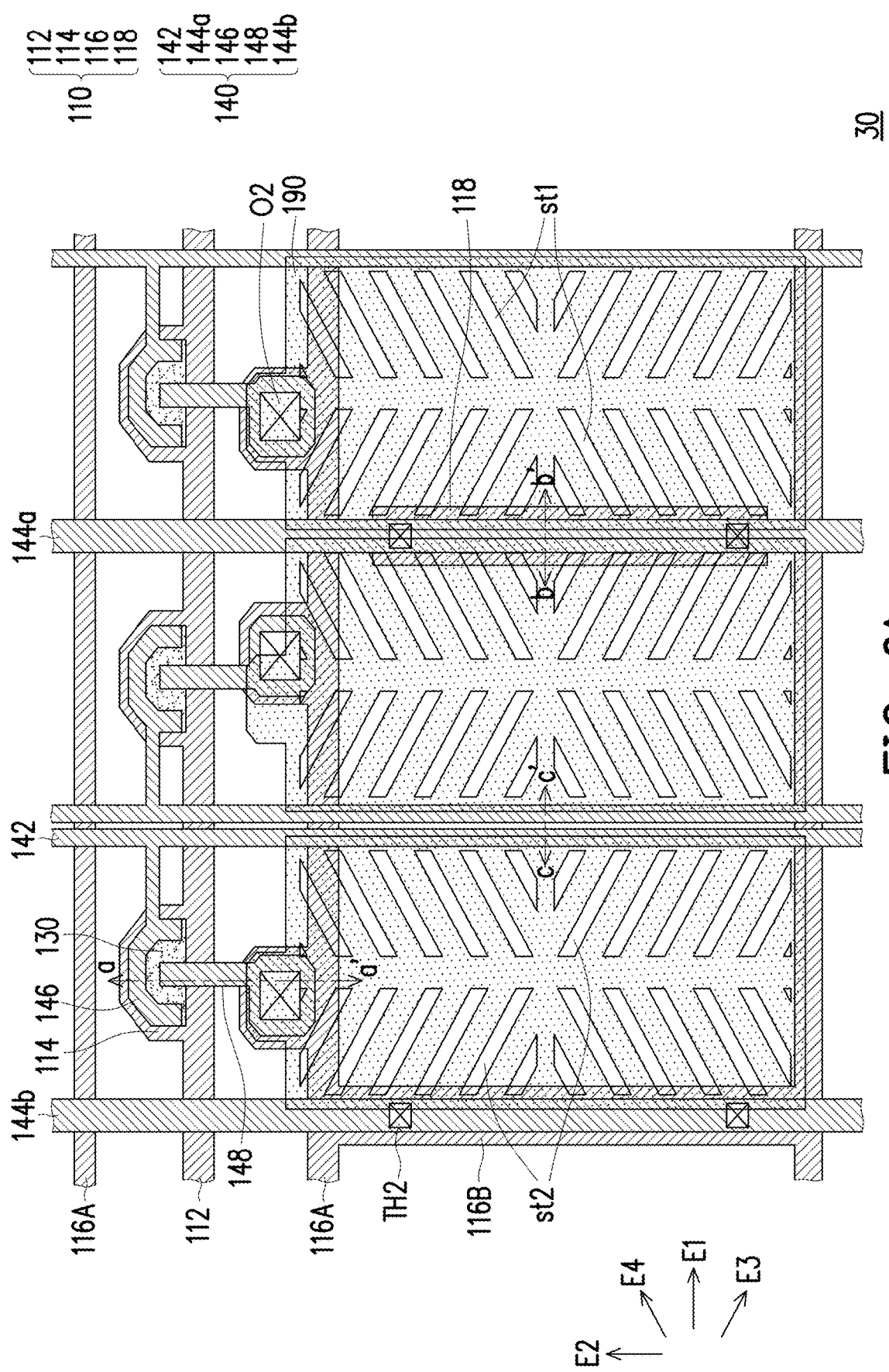
FIG. 6A is a schematic top view of a display device according to an embodiment of the invention.
Figure 6B:
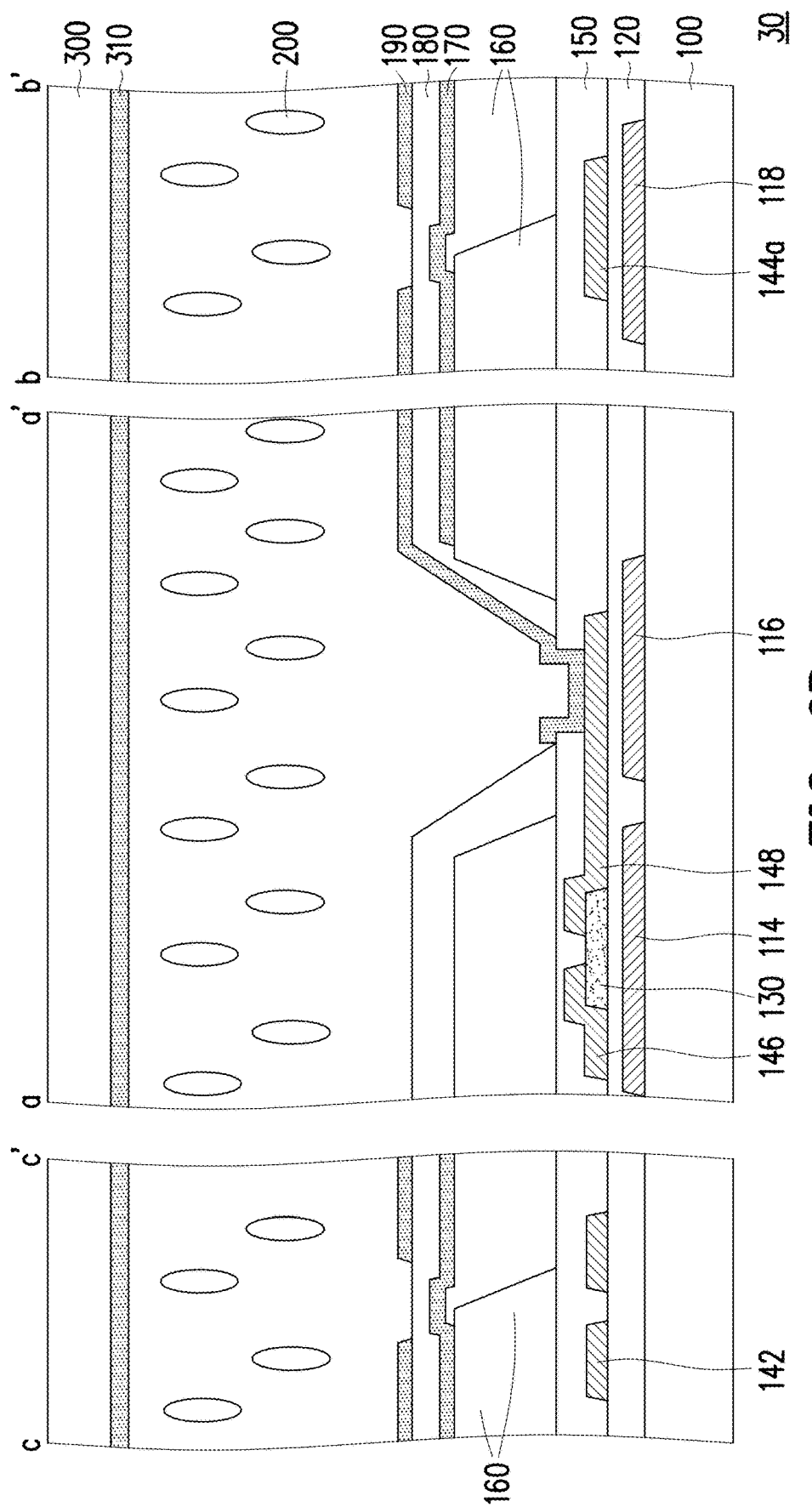
FIG. 6B is a schematic cross-sectional view of a display device according to an embodiment of the invention.

FIG. 6A is a schematic top view of a display device according to an embodiment of the invention. FIG. 6B is a schematic cross-sectional view of a display device according to an embodiment of the invention. FIG. 6B is a schematic cross-sectional view corresponding to the lines aa', bb' and cc' of FIG. 6A, for example.

It should be noted that the reference numerals and a part of the contents in the embodiment of FIG. 5 are also used to describe the embodiments of FIG. 6A and FIG. 6B, in which the same reference numerals are used to represent identical or similar elements, and thus descriptions of the same technical contents are omitted. For the description of the omitted parts, reference may be made to the foregoing embodiments, which will not be repeated here.

Referring to FIG. 6A and FIG. 6B, in this embodiment, a first common electrode 116 includes a main portion 116A extending along a first direction E1 and a plurality of branch portions 116B extending along a second direction E2. Here, the branch portions 116B are connected to the main portion 116A. In this embodiment, the main portion 116A is disposed on both sides of each of the scan lines 112. In other words, each of the scan lines 112 is located between two of the main portions 116A.

In this embodiment, a gate signal line 144a is located between adjacent two columns of pixel electrodes 190, a common signal line 144b is located between adjacent two columns of the pixel electrodes 190, and adjacent two of data lines 142 are disposed between adjacent two columns of the pixel electrodes 190. The common signal lines 144b are electrically connected to the branch portions 116B through a plurality of through holes TH2 of a gate insulating layer 120. The gate signal lines 144a are electrically connected to auxiliary structures 118 through the through holes TH2 of the gate insulating layer 120.

In this embodiment, a voltage on the pixel electrodes 190 is different from the voltage on a shielding electrode (not shown in FIG. 6A) and the first common electrode 116. The shielding electrode 170 is located between the pixel electrodes 190 and the first common electrodes 116 and can reduce the electric field between the pixel electrodes 190 and the first common electrodes 116. Since the shielding electrode 170 is located on the color filter layer 160, the shielding electrode 170 can reduce the adverse effect of the capacitance corresponding to the color filter layer 160 on the quality of the display screen.

Figure 7A:
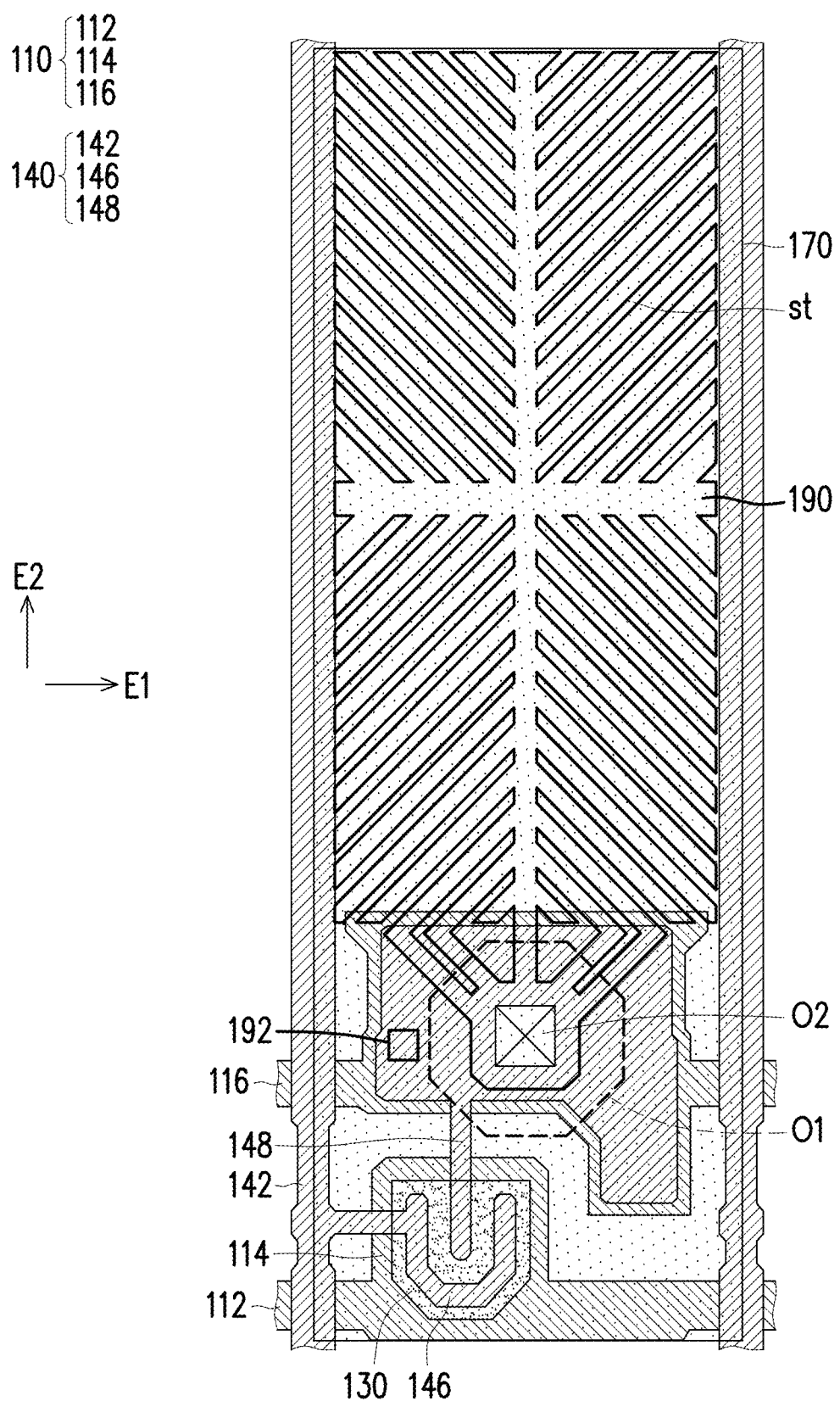
FIG. 7A is a schematic top view of a display device according to an embodiment of the invention.
Figure 7B:
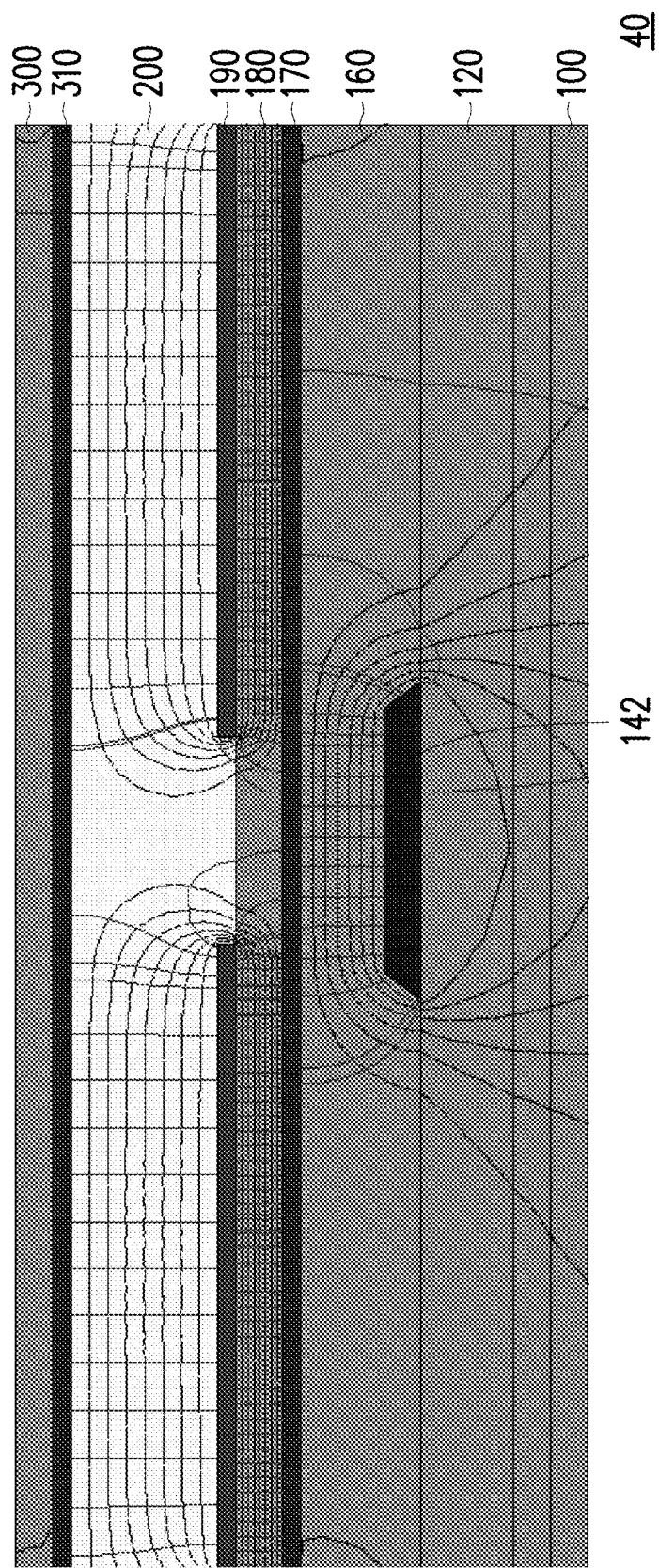
FIG. 7B is a schematic diagram of an electric field distribution of a display device according to an embodiment of the invention.

FIG. 7A is a schematic top view of a display device according to an embodiment of the invention. FIG. 7B is a schematic diagram of an electric field distribution of a display device according to an embodiment of the invention. FIG. 7B is the schematic diagram of the electric field distribution of the display device of FIG. 7A, for example.

Referring to FIG. 7A and FIG. 7B, a display device 40 includes a first substrate 100, a first metal layer 110, a gate insulating layer 120, a semiconductor channel 130, a second metal layer 140, a color filter layer 160, a shielding electrode 170, an insulating layer 180, a pixel electrode 190, a liquid crystal layer 200, a second substrate 300 and a second common electrode 310.

The first metal layer 110 is located on the first substrate 100 and includes a plurality of scan lines 112, a plurality of gates 114 and a plurality of first common electrodes 116. In some embodiments, a buffer layer (not shown) is further provided between the first substrate 100 and the first metal layer 110, but the invention is not limited thereto.

The scan lines 112 and the first common electrodes 116 extend along a first direction E1. The gates 114 are respectively connected to the scan lines 112. The scan lines 112 and the first common electrodes 116 are structurally separated from each other.

In this embodiment, the first metal layer 110 is a single-layer or multi-layer structure, and a shape thereof is defined by the same photomask.

The gate insulating layer 120 is located on the first metal layer 110. The semiconductor channel 130 is located on the gate insulating layer 120, and overlaps the gate 114.

The second metal layer 140 is located on the gate insulating layer 120, and includes a plurality of data lines 142, a plurality of sources 146 and a plurality of drains 148.

The data lines 142 extend along a second direction E2. The data lines 142 are respectively electrically connected to the sources 146. The sources 146 and the drains 148 are respectively electrically connected to the semiconductor channels 130.

The color filter layer 160 is located on the second metal layer 140. The color filter layer 160 has a plurality of first openings O1 overlapping the drains 148. The color filter layer 160 includes, for example, a red filter layer, a blue filter layer and a green filter layer. Boundaries between filter layers of different colors overlap the data lines 142, for example.

The shielding electrode 170 is located on the color filter layer 160. The shielding electrode 170 at least partially overlaps the second metal layer 140. In this embodiment, a material of the shielding electrode 170 includes a transparent conductive material.

The insulating layer 180 is located on the color filter layer 160, and has a plurality of second openings O2 overlapping the first openings O1. The shielding electrode 170 is located between the color filter layer 160 and the insulating layer 180.

The pixel electrodes 190 are located on the insulating layer 180, and are electrically connected to the drains 148 through the second openings O2. Each of the pixel electrodes 190 has a plurality of slits st. In some embodiments, a width of the slits st is 1.5 μm to 4 μm.

In this embodiment, the shielding electrode 170 is located between the pixel electrode 190 and the color filter layer 160. In this embodiment, the shielding electrode 170 and the first common electrodes 116 have the same voltage. In some embodiments, the shielding electrode 170 and the first common electrodes 116 are electrically connected to each other. For instance, the shielding electrode 170 and the first common electrodes 116 are connected to each other in a non-display area.

In this embodiment, a voltage on the pixel electrodes 190 is different from the voltage on the shielding electrode 170 and the first common electrodes 116. The shielding electrode 170 is located between the pixel electrode 190 and the color filter layer 160 and can reduce a density of line of electric force passing through the color filter layer 160. In other words, the shielding electrode 170 can reduce the adverse effect of the capacitance corresponding to the color filter layer 160 on the quality of the display screen. In some embodiments, the shielding electrode 170 also partially overlaps the data line 142, so as to reduce the capacitance formed by the color filter layer 160 between the data line 142 and the pixel electrode 190.

In some embodiments, a passivation layer may be further provided between the shielding electrode 170 and the color filter layer 160 to prevent the shielding electrode 170 from being directly formed on the color filter layer 160 with an uneven surface, but the invention is not limited thereto.

In this embodiment, each of the shielding electrodes 170 overlaps the pixel electrodes 190 of a plurality of sub-pixels.

The liquid crystal layer 200 is located between the first substrate 100 and the second substrate 300. The second common electrode 310 is located on the second substrate 300. In this embodiment, the display device 40 is a vertical alignment liquid crystal display panel. In some embodiments, the display device 40 further includes a detection structure 192. The detection structure 192 and the pixel electrode 190 belong to the same film layer, and the detection structure 192 is suitable for monitoring a manufacturing process of the pixel electrode 190.

Figure 8A:
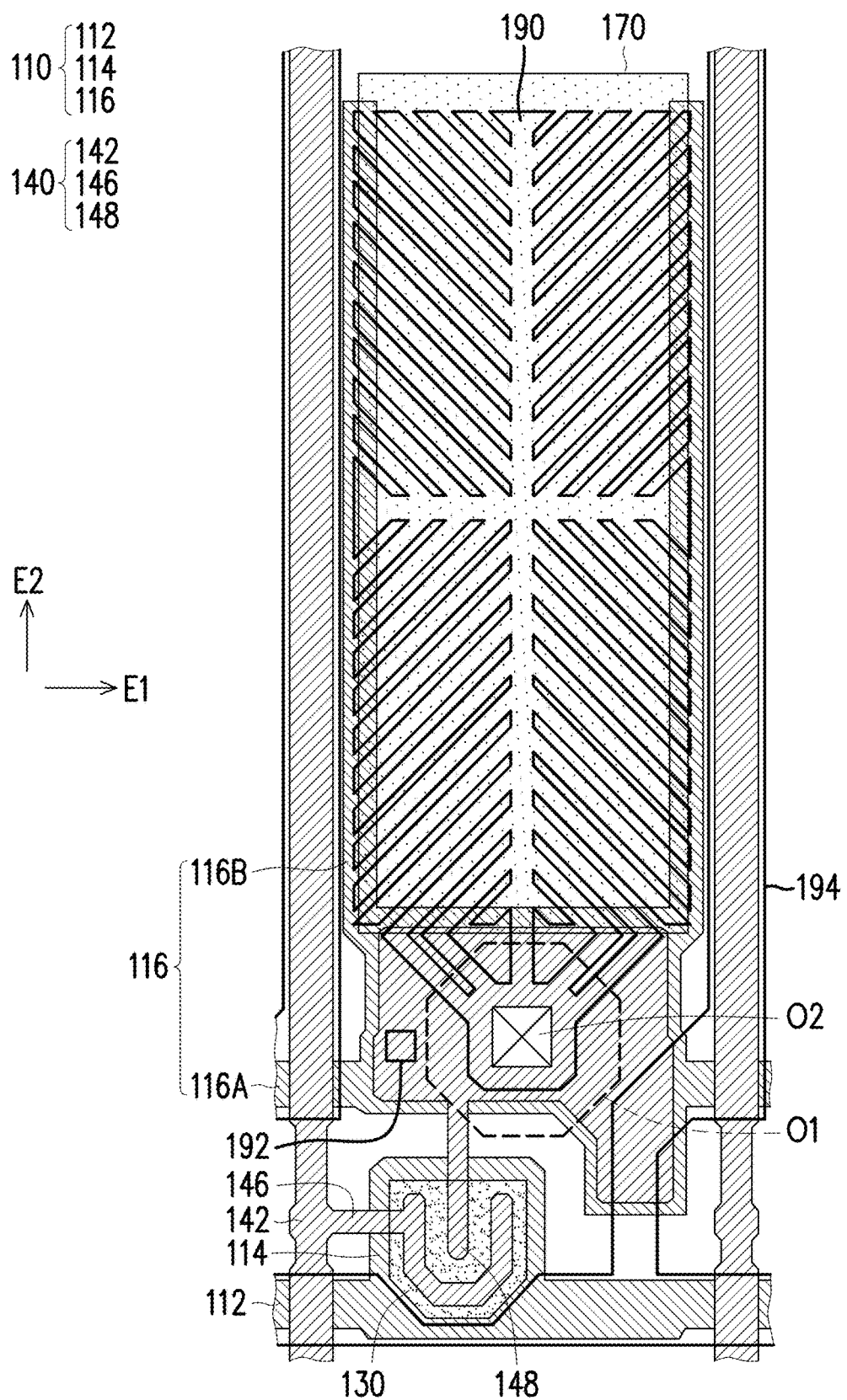
FIG. 8A is a schematic top view of a display device according to an embodiment of the invention.
Figure 8B:
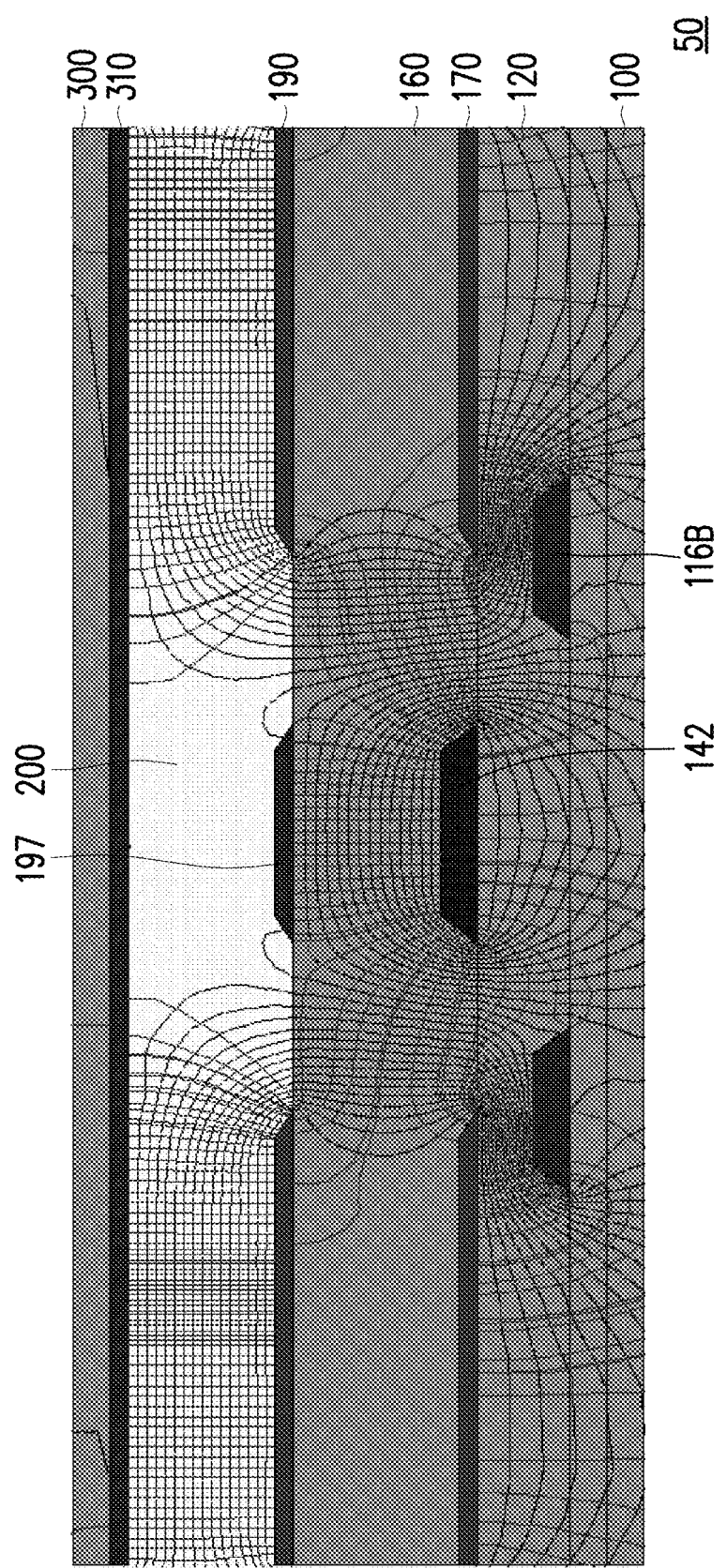
FIG. 8B is a schematic diagram of an electric field distribution of a display device according to an embodiment of the invention.

FIG. 8A is a schematic top view of a display device according to an embodiment of the invention. FIG. 8B is a schematic diagram of an electric field distribution of a display device according to an embodiment of the invention. FIG. 8B is the schematic diagram of the electric field distribution of the display device of FIG. 8A, for example.

It should be noted that, the embodiment of FIG. 8A and FIG. 8B adopts the reference numbers and part of the content in the embodiments of FIG. 7A and FIG. 7B, where identical or similar reference numbers are used to indicate identical or similar components, and repeated description for the same technical contents is omitted. For the description of the omitted parts, reference may be made to the foregoing embodiments, which will not be repeated here.

Referring to FIG. 8A and FIG. 8B, in a display device 50, a shielding electrode 170 is located between a color filter layer 160 and a gate insulating layer 120, and the shielding electrode 170 overlaps and directly contacts a drain 148. In other words, the shielding electrode 170, the drain 148 and a pixel electrode 190 have the same voltage.

In the display device 50, a first common electrode 116 includes a main portion 116A extending along a first direction E1 and a plurality of branch portions 116B extending along a second direction E2. The branch portions 116B are connected to the main portion 116A.

In some embodiments, a normal projection of the branch portion 116B on a first substrate 100 is located between a normal projection of the pixel electrode 190 on the first substrate 100 and a normal projection of a data line 142 on the first substrate 100.

In this embodiment, the shielding electrode 170 is located between the color filter layer 160 and the gate insulating layer 120 and can reduce a density of line of electric force passing through the color filter layer 160. In other words, the shielding electrode 170 can reduce the adverse effect of the capacitance corresponding to the color filter layer 160 on the quality of the display screen. For instance, the shielding electrode 170 can reduce the capacitance between the pixel electrode 190 and the branch portions 116B.

In this embodiment, each sub-pixel of the display device 50 has one shielding electrode 170. In other words, the display device includes a plurality of the shielding electrodes 170. In this embodiment, each of the shielding electrodes 170 overlaps the pixel electrode 190 of one sub-pixel.

In this embodiment, the display device 50 further includes a common electrode 194. The common electrode 194 overlaps the data line 142 and a scan line 112. In some embodiments, the common electrode 194 and the pixel electrode 190 belong to the same film layer, and a voltage of the common electrode 194 is, for example, 6.5V.

Figure 9A:
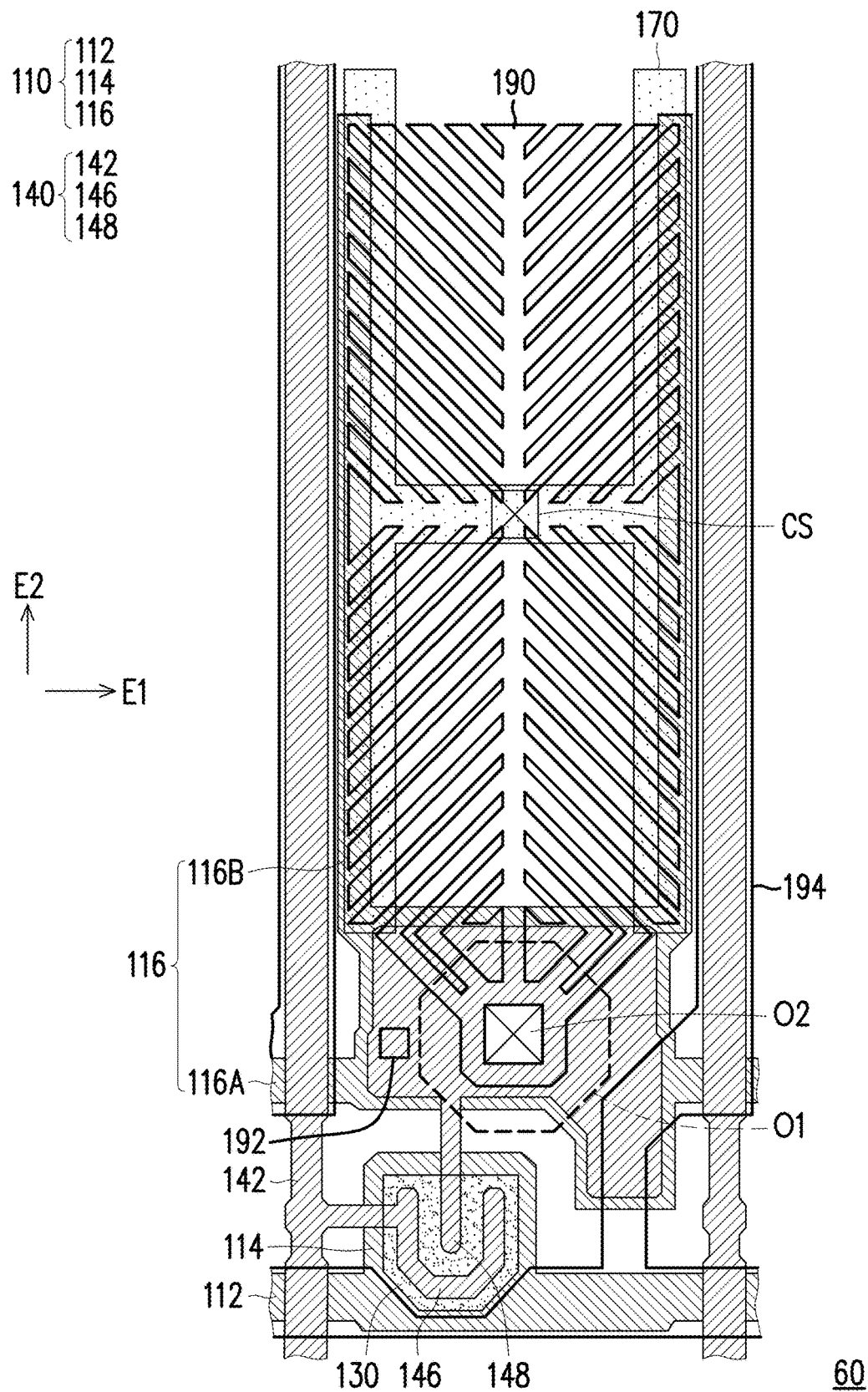
FIG. 9A is a schematic top view of a display device according to an embodiment of the invention.
Figure 9B:
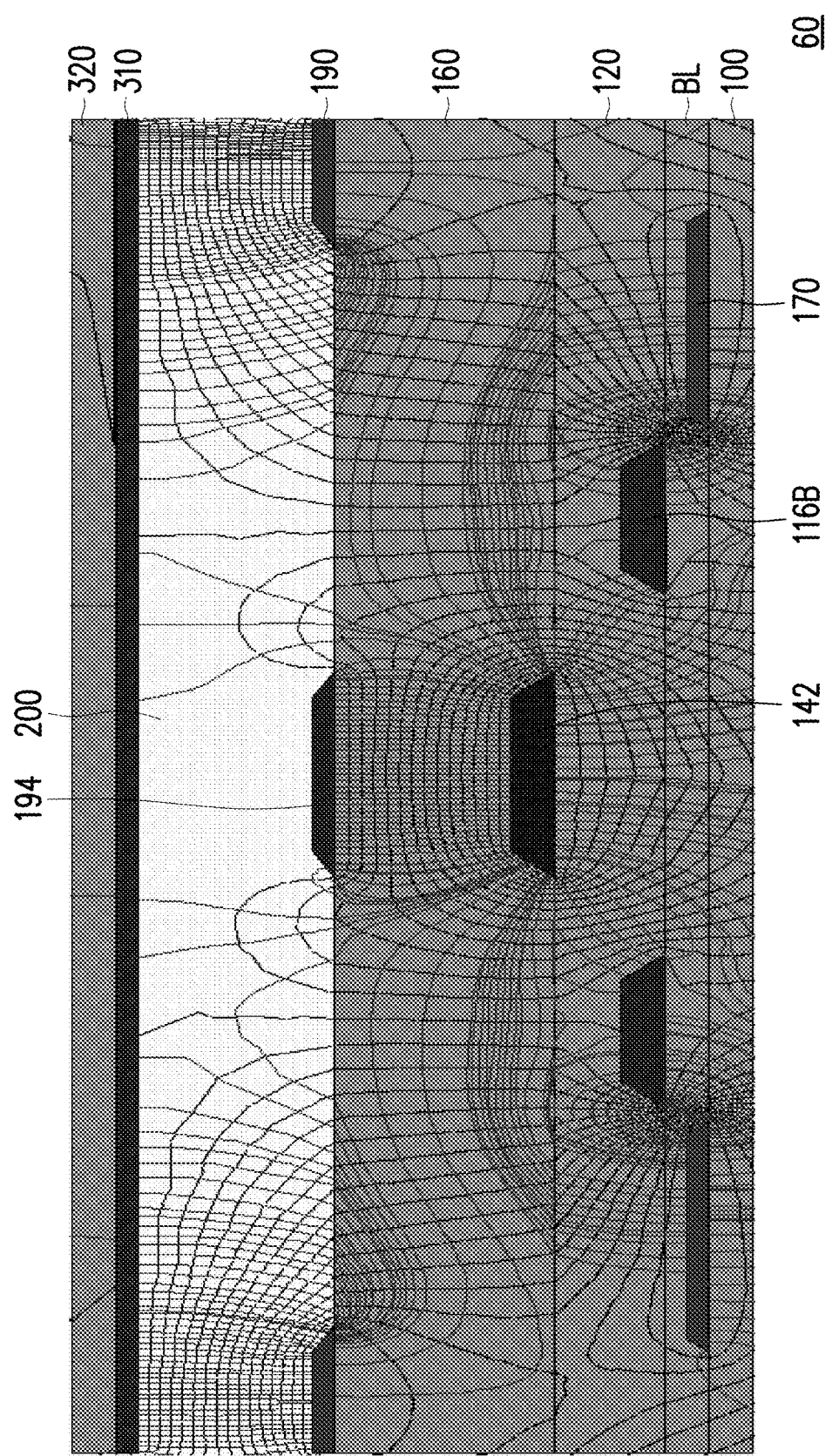
FIG. 9B is a schematic diagram of an electric field distribution of a display device according to an embodiment of the invention.

FIG. 9A is a schematic top view of a display device according to an embodiment of the invention. FIG. 9B is a schematic diagram of an electric field distribution of a display device according to an embodiment of the invention. FIG. 9B is the schematic diagram of the electric field distribution of the display device of FIG. 9A, for example.

It should be noted that, the embodiment of FIG. 9A and FIG. 9B adopts the reference numbers and part of the content in the embodiments of FIG. 8A and FIG. 8B, where identical or similar reference numbers are used to indicate identical or similar components, and repeated description for the same technical contents is omitted. For the description of the omitted parts, reference may be made to the foregoing embodiments, which will not be repeated here.

Referring to FIG. 9A and FIG. 9B, in a display device 60, a first common electrode 116 includes a main portion 116A extending along a first direction E1 and a plurality of branch portions 116B extending along a second direction E2. The branch portions 116B are connected to the main portion 116A.

In some embodiments, a normal projection of the branch portion 116B on a first substrate 100 is located between a normal projection of the pixel electrode 190 on the first substrate 100 and a normal projection of a data line 142 on the first substrate 100.

A buffer layer BL is located between the first common electrode 116 and the first substrate 100. In this embodiment, the buffer layer BL is located between the first metal layer 110 and the first substrate 100. A shielding electrode 170 is located between the buffer layer BL and the first substrate 100.

In this embodiment, a normal projection of the shielding electrode 170 on the first substrate 100 is substantially H-shaped. The normal projection of the shielding electrode 170 on the first substrate 100 is adjacent to a normal projection of the branch portions 116B on the first substrate 100.

In this embodiment, the shielding electrode 170 is electrically connected to the pixel electrode 190 through a connection structure CS. The connection structure CS may be a single-layer or multi-layer conductive structure. The shielding electrode 170 and the pixel electrode 190 have the same potential.

In this embodiment, a distance between the shielding electrode 170 and the first common electrode 116 is less than a distance between the pixel electrode 190 and the first common electrode 116. A density of line of electric force between the shielding electrode 170 and the first common electrode 116 is greater than a density of line of electric force between the pixel electrode 190 and the first common electrode 116. The arrangement of the shielding electrode 170 can reduce a density of line of electric force passing through the color filter layer 160. Accordingly, the adverse effect of the capacitance corresponding to the color filter layer 160 on the quality of the display screen can be reduced.

Figure 10:
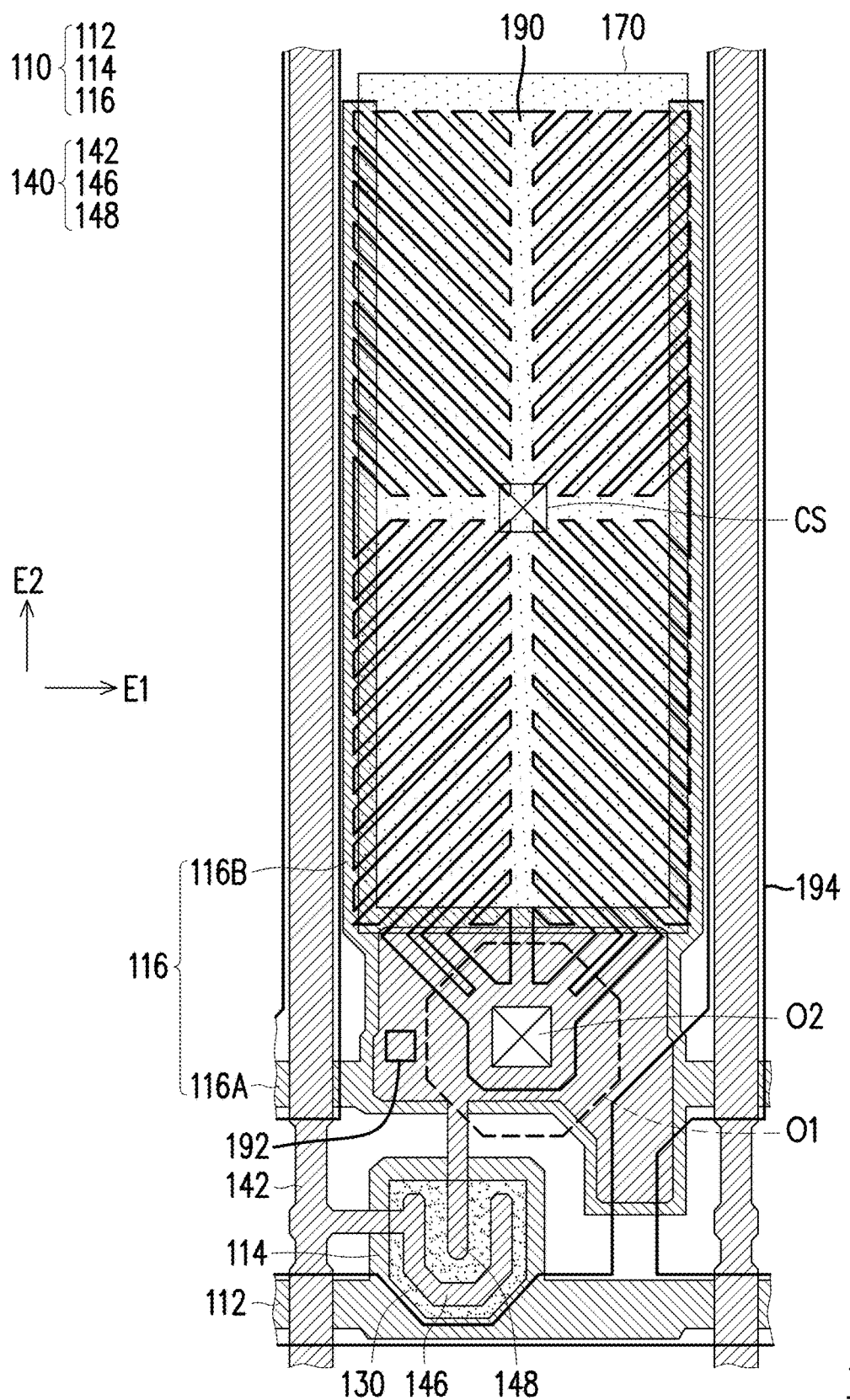
FIG. 10 is a schematic top view of a display device according to an embodiment of the invention.

FIG. 10 is a schematic top view of a display device according to an embodiment of the invention. FIG. 9B is a schematic diagram of an electric field distribution of a display device according to an embodiment of the invention.

It should be noted that the reference numerals and a part of the contents in the embodiments of FIG. 9A and FIG. 9B are also used to describe the embodiment of FIG. 10, in which the same reference numerals are used to represent identical or similar elements, and thus descriptions of the same technical contents are omitted. For the description of the omitted parts, reference may be made to the foregoing embodiments, which will not be repeated here.

Referring to a display device 70 of FIG. 10 and the display device 60 of FIG. 9A, the difference between the two is that a normal projection of a shielding electrode 170 of the display device 70 on a first substrate 100 is substantially rectangular.

Figure 11A:
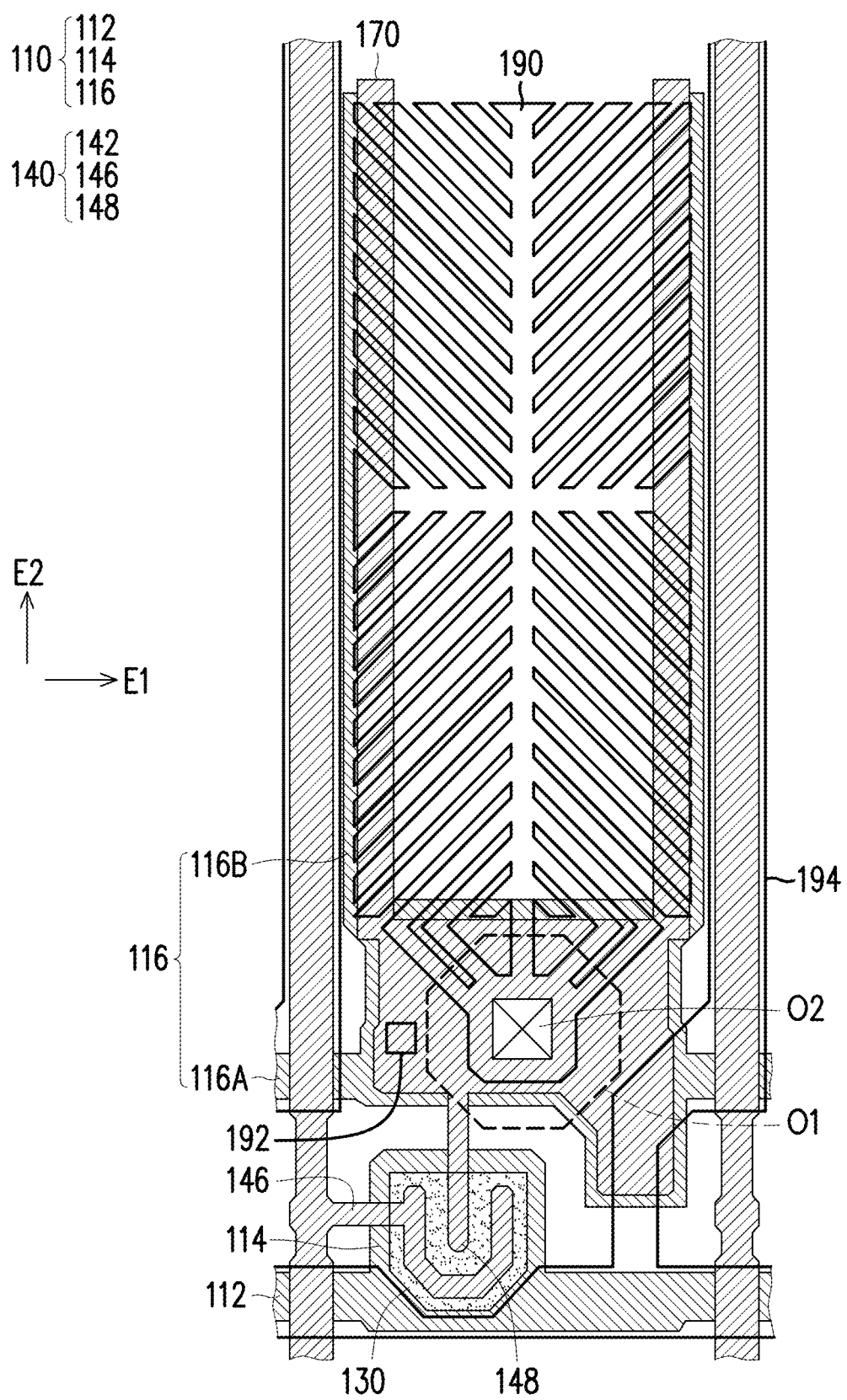
FIG. 11A is a schematic top view of a display device according to an embodiment of the invention.
Figure 11B:
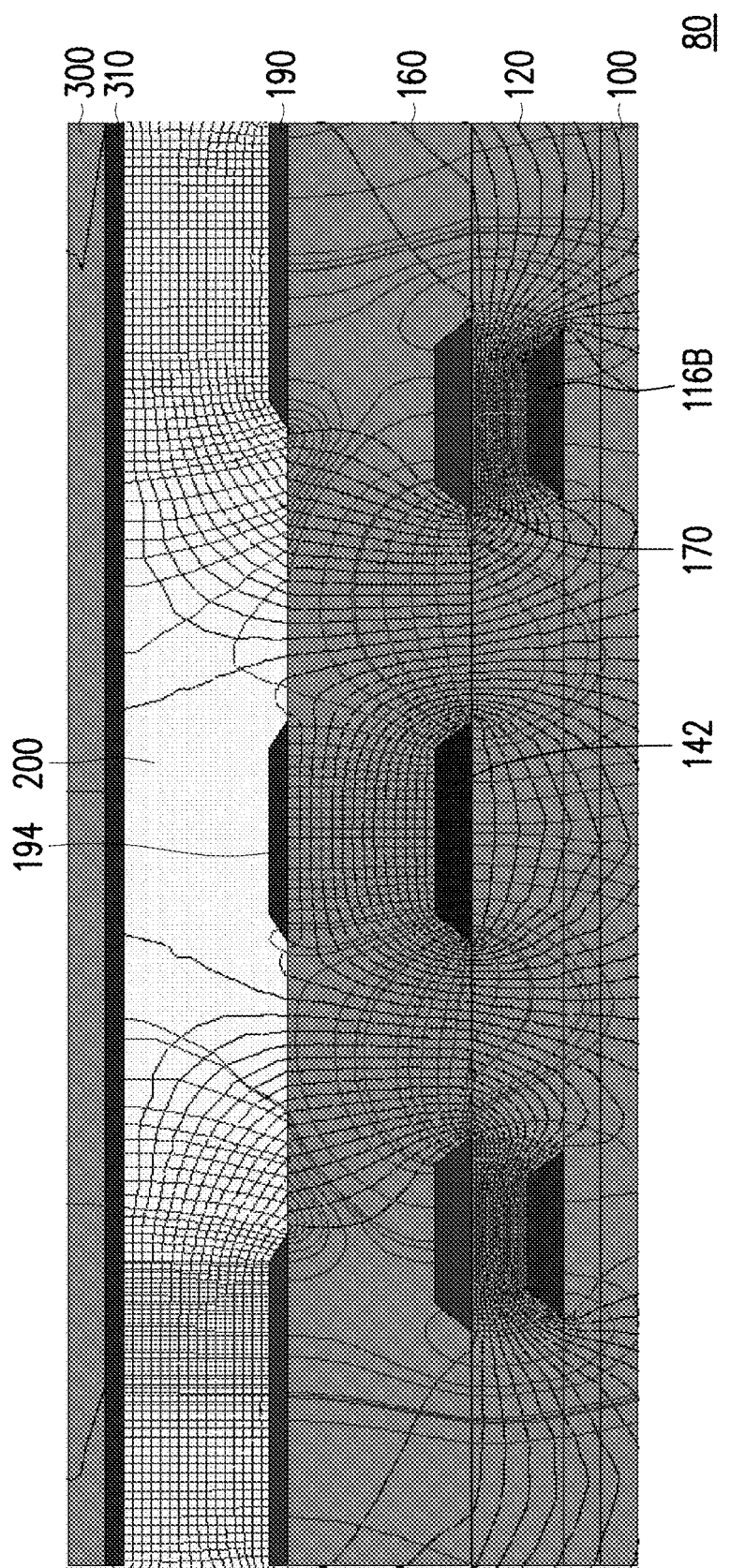
FIG. 11B is a schematic diagram of an electric field distribution of a display device according to an embodiment of the invention.

FIG. 11A is a schematic top view of a display device according to an embodiment of the invention. FIG. 11B is a schematic diagram of an electric field distribution of a display device according to an embodiment of the invention. FIG. 11B is the schematic diagram of the electric field distribution of the display device of FIG. 11A, for example.

It should be noted that, the embodiment of FIG. 11A and FIG. 11B adopts the reference numbers and part of the content in the embodiments of FIG. 9A and FIG. 9B, where identical or similar reference numbers are used to indicate identical or similar components, and repeated description for the same technical contents is omitted. For the description of the omitted parts, reference may be made to the foregoing embodiments, which will not be repeated here.

Referring to FIG. 11A and FIG. 11B, a shielding electrode 170, a drain 148, a source 146 and a data line 142 of a display device 80 belong to the same conductive layer (a second metal layer 140). The shielding electrode 170 and the drain electrode 148 are connected as a whole, and have an equal potential.

In this embodiment, the shielding electrode 170 extends along a second direction E2. A normal projection of the shielding electrode 170 on the first substrate 100 overlaps a normal projection of the branch portions 116B on the first substrate 100.

In this embodiment, a distance between the shielding electrode 170 and the first common electrode 116 is less than a distance between the pixel electrode 190 and the first common electrode 116. A density of line of electric force between the shielding electrode 170 and the first common electrode 116 is greater than a density of line of electric force between the pixel electrode 190 and the first common electrode 116. The arrangement of the shielding electrode 170 can reduce a density of line of electric force passing through the color filter layer 160. Accordingly, the adverse effect of the capacitance corresponding to the color filter layer 160 on the quality of the display screen can be reduced.

The invention claimed is:

1. A display device, comprising:
 a first substrate, a second substrate and a liquid crystal layer located between the first substrate and the second substrate;
 a first metal layer, located on the first substrate, and comprising:
   a plurality of scan lines;
   a plurality of gate, respectively connected to the scan lines; and
   a plurality of first common electrodes, separated from the scan lines;
 a gate insulating layer, located on the first metal layer;
 a plurality of semiconductor channels, located on the gate insulating layer, and overlapping the gates;
 a second metal layer, located on the gate insulating layer, and comprising:
   a plurality of sources and a plurality of drains, respectively electrically connected to the semiconductor channels; and
   a plurality of data lines, respectively electrically connected to the sources;
 a color filter layer, located on the second metal layer, and having a plurality of first openings overlapping the drains;
 a shielding electrode, at least partially overlapping the second metal layer;
 an insulating layer, located on the color filter layer, and having a plurality of second openings overlapping the first openings;
 a plurality of pixel electrodes, located on the insulating layer, and electrically connected to the drains through the second openings, wherein each of the pixel electrodes has a plurality of slits, wherein the shielding electrode is a H shaped shielding electrode and is electrically connected to a corresponding one pixel electrode through a connection structure, wherein the H shaped shielding electrode comprises a first portion, a second portion and a third portion, the first portion and the second portion are parallel with each other, the third portion is connected with the first portion and the second portion, and the connection structure is substantially located at the center of the third portion; and a second common electrode, located on the second substrate.

2. The display device of claim 1, wherein the display device comprises a plurality of the shielding electrodes, the shielding electrodes are located between the color filter layer and the gate insulating layer, the shielding electrodes overlap and contact the drains, and the shielding electrodes and the pixel electrodes have the same potential.

3. The display device of claim 1, wherein a width of each of the slits is 1.5 μm to 4 μm.

4. The display device of claim 1, wherein adjacent two of the data lines are disposed between adjacent two columns of the pixel electrodes.

5. The display device of claim 1, wherein the shielding electrode is an electric field shielding electrode, and the electric field shielding electrode comprises an electric conductive material.

6. The display device of claim 1, wherein the shielding electrode is closer to the first substrate than the data lines.

7. A display device, comprising:
- a first substrate, a second substrate and a liquid crystal layer located between the first substrate and the second substrate;
- a scan line and a first common electrode, located on the first substrate, wherein the first common electrode comprises a main portion extending along a first direction and a plurality of branch portions extending along a second direction, wherein the branch portions are connected to the main portion, and the scan line extends along the first direction;
- a gate, connected to the scan line;
- a gate insulating layer, located on the gate;
- a semiconductor channel, located on the gate insulating layer, and overlapping the gate;
- a source and a drain, electrically connected to the semiconductor channel;
- a data line, electrically connected to the source, and extending along the second direction;
- a color filter layer, located on the gate insulating layer, and having a first opening overlapping the drain;
- an insulating layer, located on the color filter layer, and having a second opening overlapping the first opening;
- a pixel electrode, located on the insulating layer, and electrically connected to the drain through the second opening, wherein the pixel electrode has a plurality of slits;
- a shielding electrode, wherein a normal projection of the shielding electrode on the first substrate is adjacent to or overlaps a normal projection of the branch portions on the first substrate, and the shielding electrode and the pixel electrode have the same potential, wherein the shielding electrode is a H shaped shielding electrode and is electrically connected to the pixel electrode through a connection structure, wherein the H shaped shielding electrode comprises a first portion, a second portion and a third portion, the first portion and the second portion are parallel with each other, the third portion is connected with the first portion and the second portion, and the connection structure is substantially located at the center of the third portion; and
- a second common electrode, located on the second substrate.

8. The display device of claim 7, further comprising:
a buffer layer, located between the first common electrode and the first substrate, and the shielding electrode is located between the buffer layer and the first substrate.

9. The display device of claim 8, wherein the shielding electrode is electrically connected to the pixel electrode.

10. The display device of claim 7, wherein the shielding electrode, the drain, the source and the data line belong to the same conductive layer, the shielding electrode and the drain are connected as a whole, and the shielding electrode extends along the second direction.

11. The display device of claim 7, wherein the shielding electrode is an electric field shielding electrode, and the electric field shielding electrode comprises an electric conductive material.

12. The display device of claim 7, wherein the shielding electrode is closer to the first substrate than the data line.

* * * * *